(12) United States Patent  
Steinmacher-Burow

(10) Patent No.: US 9,940,128 B2
(45) Date of Patent: Apr. 10, 2018

(54) CONDITIONAL ACCESS WITH TIMEOUT

(71) Applicant: International Business Machines Corporation, Armonk, NY (US)

(72) Inventor: Burkhard Steinmacher-Burow, Esslingen (DE)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 14/875,829

(22) Filed: Oct. 6, 2015

(65) Prior Publication Data

US 2017/0097779 A1 Apr. 6, 2017

(51) Int. Cl.
*G06F 9/30* (2006.01)
*G06F 12/00* (2006.01)
*G06F 9/46* (2006.01)

(52) U.S. Cl.
CPC .............. *G06F 9/30* (2013.01); *G06F 9/3004* (2013.01); *G06F 9/30043* (2013.01); *G06F 9/30072* (2013.01); *G06F 9/30087* (2013.01); *G06F 9/46* (2013.01); *G06F 12/00* (2013.01)

(58) Field of Classification Search
CPC .... G06F 3/0613; G06F 3/0653; G06F 3/0671; G06F 2221/0795
See application file for complete search history.

(56) References Cited

U.S. PATENT DOCUMENTS

| | | | |
|---|---|---|---|
| 6,381,667 B1 * | 4/2002 | Brown | G06F 13/4031 710/305 |
| 6,546,443 B1 * | 4/2003 | Kakivaya | G06F 9/524 710/108 |
| 7,437,521 B1 | 10/2008 | Scott et al. | |
| 2006/0173885 A1 * | 8/2006 | Moir | G06F 9/466 |
| 2007/0157200 A1 * | 7/2007 | Hopkins | G06F 9/52 718/100 |

(Continued)

OTHER PUBLICATIONS

Afek et al., "Scalable Producer-Consumer Pools Based on Elimination-Diffraction Trees", Proceedings of the European Conference on Parallel Computing (EuroPar), Aug. 2010, 10 pages http://people.csail.mit.edu/shanir/publications/Ed%20Tree%20EuroPar%2010.pdf.

(Continued)

*Primary Examiner* — Mano Padmanabhan
*Assistant Examiner* — Patrick Borges
(74) *Attorney, Agent, or Firm* — Scott S. Dobson

(57) ABSTRACT

A method can include receiving a first memory load request by a conditional load with time out (CLT) device at a first time. The first memory load request can specify a first condition. A first determination of whether the first condition is satisfied is performed. The CLT device determines a wait period when the first condition is not satisfied. A reply is issued. The reply indicates that the first condition is satisfied when the first condition is satisfied. The reply indicates that the first condition is not satisfied when the duration of the wait period exceeds a time-out threshold. When the first condition is not satisfied, a first memory store request can be received during the wait period and a second determination of whether the first condition satisfied performed. The reply indicates that the first condition is satisfied when the second determination is that the first condition is satisfied.

17 Claims, 12 Drawing Sheets

(56) References Cited

U.S. PATENT DOCUMENTS

| | | | |
|---|---|---|---|
| 2010/0250802 A1* | 9/2010 | Waugh | G06F 13/4022 710/100 |
| 2011/0202729 A1* | 8/2011 | Bohizic | G06F 9/3004 711/141 |
| 2012/0204163 A1* | 8/2012 | Marathe | G06F 8/4442 717/151 |
| 2013/0275715 A1* | 10/2013 | Caprioli | G06F 12/10 711/203 |
| 2013/0290967 A1* | 10/2013 | Calciu | G06F 9/526 718/102 |
| 2014/0156959 A1* | 6/2014 | Heidelberger | G06F 5/065 711/163 |
| 2014/0181414 A1* | 6/2014 | Eckert | G06F 12/0808 711/135 |
| 2014/0375422 A1* | 12/2014 | Huber | G07C 9/00174 340/5.61 |
| 2015/0046662 A1* | 2/2015 | Heinrich | G06F 13/1621 711/151 |

OTHER PUBLICATIONS

Agarwal et al., "The MIT Alewife Machine", Laboratory for Computer Science, Massachusetts Institute of Technology, (earlier version appeared in ISCA'95), 14 pages http://groups.csail.mit.edu/cag/pub/papers/pdf/alewife-paper-proc.pdf.

Altman et al., "Performance Analysis of Idle Programs", OOPSLA'10: Proceedings of the ACM International Conference on Object Oriented Programming Systems Languages and Applications, Oct. 2010, ACM, New York, NY, ©2010, 15 pages, DOI: 10.1145/1869459.1869519.

Alverson et al., "Cray XC Series Network", Cray, Inc., WP-Aries01-1112, © 2012 Cray, Inc., 28 pages http://www.nersc.gov/assets/Uploads/CrayXC30Networking.pdf.

"Atomic", GCC wiki, last modified Jul. 27, 2012 by Shawn Landden, 3 pages, printed on Aug. 15, 2013 http://gcc.gnu.org/wiki/Atomic.

Barnett et al., "Optimizing Sybase Adaptive Server Enterprise (ASE) for IBM AIX", An IBM and Sybase White Paper on optimizing Sybase ASE 15 for IBM AIX 5L, AIX 6.1, and AIX 7.1 on IBM POWER5, POWER6, and POWER7 processor-based serviers, Jan. 2012, © Copyright IBM Corporation 2012, 56 pages http://www.aixmind.com/wp-content/uploads/2012/04/Optimizing-Sybase-Adaptive-Server-EnterpriseASE-for-IBM-AIX.pdf.

Bonnichsen, L., "Contention resistant non-blocking priority queues", Technical University of Denmark, Informatics and Mathematical Modelling, 2012, 119 pages http://www2.imm.dtu.dk/pubdb/views/edoc_download.php/6274/pdf/imm6274.pdf.

Cebrian et al., "Power Token Balancing: Adapting CMPs to Power Constraints for Parallel Multithreaded Workloads", IPDPS'11: Proceedings of the 2011 IEEE International Paralleled and Distributed Processing Symposium, May 2011, 12 pages, http://skywalker.inf.um.es/~jcebrian/papers/jmcg_ipdps11.pdf.

"Compare-and-Swap", Wikipedia the free encyclopedia, 3 pages, printed on Aug. 13, 2013 http://en.wikipedia.org/wiki/compare-and-swap.

Convey, "Convey MX Series Architectural Overview", Convey White Paper, © 2012 Convey Computer Corporation, 12 pages, http://www.conveycomputer.com/files/5913/5266/3278/CONV-12-036.1MXarchOvrvwWeb.pdf.

Dice et al., "Brief Announcement: MultiLane—A Concurrent Blocking Multiset", SPAA'11: Proceedings of the 23rd ACM Symposium on Parallelism in Algorithms and Architectures, Jun. 2011, pp. 313-314.

Eastep et al., "Smartlocks: Lock Acquisition Scheduling for Self-Aware Synchronization", ICAC'10: Proceedings of the 7th International Conference on Automatic Computing, Jun. 2010, Copyright 2010 ACM, 10 pages http://web.mit.edu/~wingated/www/papers/icac10.pdf.

Faanes et al., "Cray Cascade: a Scalable HPC System based on a Dragonfly Network", 2012 International Conference for High Performance Computing, Networking, Storage and Analysis (SC), © 2012 IEEE, 9 pages DOI: 10.1109/SC.2012.39.

Fang et al., "Active Memory Operations", ICS'07: Proceedings of the 21st Annual International Conference on Supercomputing, Jun. 2007, Copyright 2007 ACM, 10 pages http://www.cs.utah.edu/~retrac/papers/ics07.pdf.

Fischer, R., "Smarter Computing: Tomorrow Ready", IBM Corporation, 2012, 15 pages https://www-950.ibm.com/events/wwe/grp/grp019.nsf/vLookupPDFs/2012%2010%2009%20IBM%20Presentation%20Ralf%20Fischer/$file/2012%2010%2009%20IBM%20Presentation%20Ralf%20Fischer.pdf.

Grove, D., "Multicore Software Challenges", Barcelona Multicore Workshop 2010, © 2010 IBM Corporation, 31 pages, http://www.bscmsrc.eu/sites/default/files/IBM-Grove-Challenges.pdf.

Hall et al., "POWER7 and POWER7+ Optimization and Tuning Guide", Redbooks, International Technical Support Organization, Nov. 2012, © Copyright International Business Machines Corporation 2012, 224 pages http://www.redbooks.ibm.com/redbooks/pdfs/sg248079.pdf.

Hendler et al., "Flat Combining and the Synchronization-Parallelism Tradeoff", SPAA'10: Proceedings of the 22nd ACM Symposium on Parallelism in Algorithms and Architectures, Jun. 2010, Copyright 2010 ACM, 10 pages http://www.cs.bgu.ac.il/~hendlerd/papers/flat-combining.pdf.

IBM, "Fetch Functions", Information Center, SL C/C++ for AIX, V 10.1 (compiler reference: compiler built-in functions: synchronization and atomic built-in functions), 1 page, printed on Aug. 15, 2013 http://publib.boulder.ibm.com/infocenter/comphelp/v101v121/index.jsp?topic=/com.ibm.xlcpp101.aix.doc/compiler_ref/bifs_fetch.html.

Intel, "Intel C++ Intrinsic Reference", Document 312482-003US, Copyright © 1996-2007 Intel Corporation, (portions Copyright © 2001 Hewlett-Packard Development Company, L.P.), 202 pages http://software.intel.com/sites/default/files/m/9/4/c/8/e/18072-347603.pdf.

Intel, "Intel Itanium Processor-Specific Application Binary Interface (ABI)", Document No. 245370-003, May 2001, Copyright © 2001 Intel Corporation, 72 pages, http://download.intel.com/design/itanium/downloads/245370.pdf.

Intel, "Intel 64 and IA-32 Architectures Software Developer's Manual", vol. 3A: System Programming Guide, Part 1, Mar. 2010, Copyright © 1997-2010 Intel Corporation, 812 pages http://www.intel.com/Assets/ja_JP/PDF/manual/253668.pdf.

Intel PR, "Intel Acquires Industry-Leading, High-Performance Computing Interconnect Technology and Expertise", Intel Corporation Newsroom, Posted Apr. 24, 2012, © Intel Corporation, 1 page, printed on Aug. 14, 2013 http://newsroom.intel.com/community/intel_newsroom/blog/2012/04/24/intel-acquires-industry-leading-high-performance-computing-interconnect-technology-and-expertise.

Jooybar et al., "GPUDet: A Deterministic GPU Architecture", ASPLOS'13: Proceedings of the 8th International Conference on Architectural Support for Programming Languages and Operating Systems, Copyright © 2013 ACM, 12 pages, https://www.ece.ubc.ca/~aamodt/papers/jooybar.asplos2013.pdf.

Kaldewey et al., "GPU Join Processing Revisited", Proceedings of the Eight International Workshop on Data Management on New Hardware (DaMoN 2012), 2012, © 2012 ACM, 8 pages http://www.kaldewey.com/pubs/GPU_Join_DAMON12.pdf.

Lee et al., "Debunking the 100X GPU vs. CPU Myth: An Evaluation of Throughput Computing on CPU and GPU", ISCA'10: Proceedings of the 37th Annual International Symposium on Computer Architecture, pp. 451-460, Copyright 2010 ACM http://www.hwsw.hu/kepek/hirek/2010/06/p451-lee.pdf.

"Load-link/store-conditional", Wikipedia the free encyclopedia, 2 pages, printed on Aug. 13, 2013 http://en.wikipedia.org/wiki/Load-link/store-conditional.

Maltby, J., "uRiKA: A high-performance multithreaded in-memory graph database appliance", YarcData, A Division of Cray Inc., 34

(56) References Cited

OTHER PUBLICATIONS pages, ADM 2012: Third International Workshop on Accelerating Data Management Systems Using Modern Processor and Storage Architectures http://www.adms-conf.org/uRiKA_ADMS_keynote.pdf.
Mellor-Crummey, J., "Concurrent Queues: Practical Fetch-and-phi Algorithms", Technical Report 229, Department of Computer Science, University of Rochester, Nov. 1987, 28 pages http://www.cs.rice.edu/~johnmc/pubs-area.html.
Microsoft, "Interlocked Operations", Microsoft Developer Network, copyright 2013 Microsoft, 3 pages http://msdn.microsoft.com/en-us/library/sbhbke0y%28v=vs.80%29.aspx.
Morrison et al., "Fast Concurrent Queues for x86 Processors", PPoPP'13: Proceedings of the 18th ACM SIGPLAN Symposium on Principles and Practice of Parallel Programming, Feb. 2013, © 2013 ACM, 10 pages http://www.cs.tau.ac.il/~adamx/ppopp2013-x86queues.pdf.
"New Work Item Proposal on Additional Parallel Features in Fortran WG 5", ISO/IEC JTC I/SC 22, Programming Languages, their Environments and System Software Interfaces, Version Jan. 17, 2012, 9 pages http://ftp.nag.co.uk/sc22wg5/N1901-N1950/N1936.pdf.
NVIDIA, "NVIDIA GeForce GTX 680", Whitepaper, Version 1.0, NVIDIA Corporation © 2012, 29 pages http://www.geforce.com/Active/en_US/en_US/pdf/GeForce-GTX-680-Whitepaper-FINAL.pdf.
NVIDIA, "NVIDIA's Next Generation CUDA Compute Architecture: Kepler GK110", Whitepaper, NVIDIA Corporation 2012, 24 pages, http://www.nvidia.com/content/PDF/kepler/NVIDIA-Kepler-GK110-Architecture-Whitepaper.pdf.
Olivier et al., "Characterizing and Mitigating Work Time Inflation in Task Parallel Programs", SC'12: Proceedings of the International Conference on High Performance Computing, Networking, Storage and Analysis, Nov. 2012, ©2012 IEEE, 12 pages.
Oracle, "man pages section3: Basic Library Functions", Oracle, Jan. 2013, © 1993, 2013, 1026 pages http://docs.oracle.com/cd/E26505_01/pdf/816-5168.pdf.
Orozco et al., "Toward High Throughput Algorithms on Many Core Architectures", ACM Transactions on Architecture and Code Optimization, vol. 8, No. 4, Article 49, Jan. 2012, © ACM 2012, 21 pages DOI: 10.1145/2086696.2086728.
Rattner, J., "Extreme Scale Computing", ISCA 2012: The 39th International Symposium on Computer Architecture, Keynote II, Copyright Intel Corporation 2012, 26 pages http://isca2012.ittc.ku.edu/media/Rattner%20ISCA%20Keynote%2020120612%20FINAL.pdf.

Singh et al., "Cache Coherence for GPU Architectures", HPCA'13: Proceedings of the 2013 IEEE 19th International Symposium on High Performance Computer Architecture, 13 pages http://www.ece.ubc.ca/~aamodt/papers/isingh.hpca2013.pdf.
"Speculative Multithreading", Wikipedia the free encyclopedia, 1 page, printed on Aug. 13, 2013 http://en.wikipedia.org/wiki/Speculative_multithreading.
Sporer, M., "Networking Memories: Intelligence for 400G app acceleration and host offload—Part III", EE/Times, posted Nov. 1, 2012, Copyright © 2013 UBM Tech, 3 pages, printed on Aug. 23, 2013 www.eetimes.com/document.asp?doc_id=1280084.
Sutter, H., "Software and the Concurrency Revolution", ogdc 2007: Online Game Development Conference, © 2007 Herb Sutter, 13 pages, http://www.gotw.ca/resources/Software%20and%20Concurrency%20-%20OGDC.pdf.
Thompson et al., "Disruptor: High performance alternative to bounded queues for exchanging data between concurrent threads", LMAX, Version 1.0, 11 pages, disruptor.googlecode.com/files/Disruptor-1.0.pdf.
Thorson et al., "SGI UV2: A Fused Computation and Data Analysis Machine", SC'12: 2012 International Conference for High Performance Computing, Networking, Storage and Analysis, © 2012 IEEE, 9 pages DOI: 10.1109/SC.2012.102.
"Transactional memory", Wikipedia the free encyclopedia, 2 pages, printed on Aug. 13, 2013 http://en.wikipedia.org/wiki/Transactional_memory.
"Transactional Synchronization Extensions", Wikipedia the free encyclopedia, 2 pages, printed on Aug. 19, 2013 http://en.wikipedia.org/wiki/Transactional_Synchronization_Extensions.
Tullsen et al., "Supporting Fine-Grained Synchronization on a Simultaneous Multithreading Processor", Proceedings of the 5th International Symposium on High Performance Computer Architecture, Jan. 1999, 5 pages http://citeseerx.ist.psu.edu/viewdocs/summary?doi=10.1.1.52.3136.
Wang, A., "BlueGene/Q-Hardware Designed for Parallelism", IBM Toronto Laboratory, May 15, 2012, © 2012 IBM Corporation, 39 pages http://spscicomp.org/wordpress/wp-content/uploads/2012/04/ScicomP-2012-Tutorial-BGQ-Amy-Wang.pdf.
Wegener, A., "Multicore, the Memory Wall, and Numerical Compression", Samplify Systems Inc., IEEE Computer Society Meeting, 2012, © 2012 Samplify Systems Inc., 39 pages http://sites.ieee.org/scv-cs/files/2012/04/20120411-Samplify_APAX.pdf.
Wheeler, K., "Exploiting Locality with QThreads for Portable Parallel Performance", Dissertation, Graduate Program in Computer Science and Engineering, Notre Dame, Nov. 2009, 184 pages http://etd.nd.edu/ETD-db/theses/available/etd-11062009-151325/unrestricted/WheelerK112009.pdf.

* cited by examiner

| CLT INSTRUCTION | AMO STORE ACTION | ENTRY ACTION | ATOMIC | | REPLY VALUE |
|---|---|---|---|---|---|
| | | | REPLY CONDITION | If satisfied, EXIT AMO | |
| On_Zero Load(addr) | — | — | value(addr)==0 | — | value(addr) |
| On_NonZero Load(addr) | — | — | value(addr)!=0 | — | value(addr) |
| On_ZeroByte Load(addr) | — | — | byteValue(addr)==0 | — | value(addr) |
| On_Non-ZeroLine Load(addr) | — | — | cacheLine(addr)!=0 | — | value(addr) |
| On_ZeroLSBit Load(addr) | — | — | (value(addr)&1)==0 | — | value(addr) |
| On_EQOperand Load(addr, reqOp) | — | wOp=reqOp | value(addr)==wOp | — | value(addr) |
| On_NEOperand Load(addr, reqOp) | — | wOp=reqOp | value(addr)!=wOp | — | value(addr) |
| On_Zero LoadReserve(addr) | — | — | value(addr)==0 | — | value(addr) |
| On_LostReserve Load(addr) | — | — | reservation lost | — | value(addr) |
| On_LostReserve LoadReserve(addr) | — | — | reservation lost | — | value(addr) |

FIG. 5

| CLT INSTRUCTION | AMO STORE ACTION | ENTRY ACTION | ATOMIC | | REPLY VALUE |
|---|---|---|---|---|---|
| | | | REPLY CONDITION | If satisfied, EXIT AMO action | |
| decrementOnZero Load(addr) | decr(addr) | — | value(addr)==0 | — | value(addr) |
| On_Zero StoreOperand (addr, reqOp) | — | wOp=reqop | value(addr)==0 | value(addr) =wOp | value(addr) |
| incrementTicketOnTurn Load(addr) | old= value(addr); incr(addr); | wOp=old; | c= (wOp==value(addr+1)) | — | if(C) {reply -wOp} else {reply wOp} |
| On_NoOperandBits StoreBits (addr, reqOp) | — | wOp=reqOp | (c=value(addr)), (c&wOp==0) | value(addr) \|=wOp | c |

FIG. 6

CONDITIONAL ACCESS WITH TIMEOUT

BACKGROUND

The present disclosure relates to operations for accessing a shared resource by two or more competing access seekers and more specifically to conditional load memory access operations that include a time-out feature, which can be used to serialize memory access requests from two or more concurrently executing threads or processes.

When the instructions of a computer program are executed, the instance being executed is referred to as a "process." A "thread" generally refers to the smallest sequence of instructions that can be managed independently by a scheduler. Typically, a thread is a component of a process and a process can include multiple threads. One example of a thread is a subroutine. Multiple threads may share resources, such as first, second, and third level caches and a main memory. Multiple threads can be simultaneously executing within a process. Two or more threads sharing a memory is one example of two or more access seekers sharing a resource.

A processor in a computer system can include a capability to execute multiple active threads. Multiple active threads can execute on a processor having a single core or on one having multiple cores. A computer system can also include more than one processor with multiple threads or multiple processes executing on the two or more processors. Multiple active threads may each be working on a separate piece of a larger problem. The threads communicate with one another and share results by sharing a memory or hierarchy of memories. Two or more processes sharing a memory and two or more processors sharing a memory are additional examples of two or more access seekers sharing a resource.

SUMMARY

According to embodiments of the present disclosure, a method for responding to memory requests can include receiving a first memory load request by a conditional load with time out (CLT) device at a first time. The first memory load request can specify a first condition and a first memory address. The method can include performing a first determination of whether the first condition is satisfied. The method can include starting a timer at the CLT device to determine a wait period when the first condition is not satisfied. The method can also include responding to the first memory load request with a reply. The reply indicates that the first condition is not satisfied when the duration of the wait period exceeds a time-out threshold. The reply indicates that the first condition is satisfied when the first condition is satisfied. When the first condition is not satisfied, the method can include receiving a first memory store request by the CLT device at a second time subsequent to the first time and prior to the wait period exceeding the time-out threshold. The first memory store request specifies the first memory address and a value. The method can include storing the value at the first memory address. The method can include performing a second determination of whether the first condition is satisfied. The reply indicates that the first condition is satisfied when the second determination is that the first condition is satisfied.

Various embodiments are directed to a device for responding to a memory requests, as well as a computer program product for responding to a memory requests.

The above summary is not intended to describe each illustrated embodiment or every implementation of the present disclosure.

BRIEF DESCRIPTION OF THE DRAWINGS

FIG. 5 depicts a table of examples of conditional load with time-out instructions that do not change the content of a specified memory location according to various embodiments.

FIG. 6 depicts a table of examples of conditional load with time-out instructions that can change the content of a specified memory location according to various embodiments.

Figure 1:
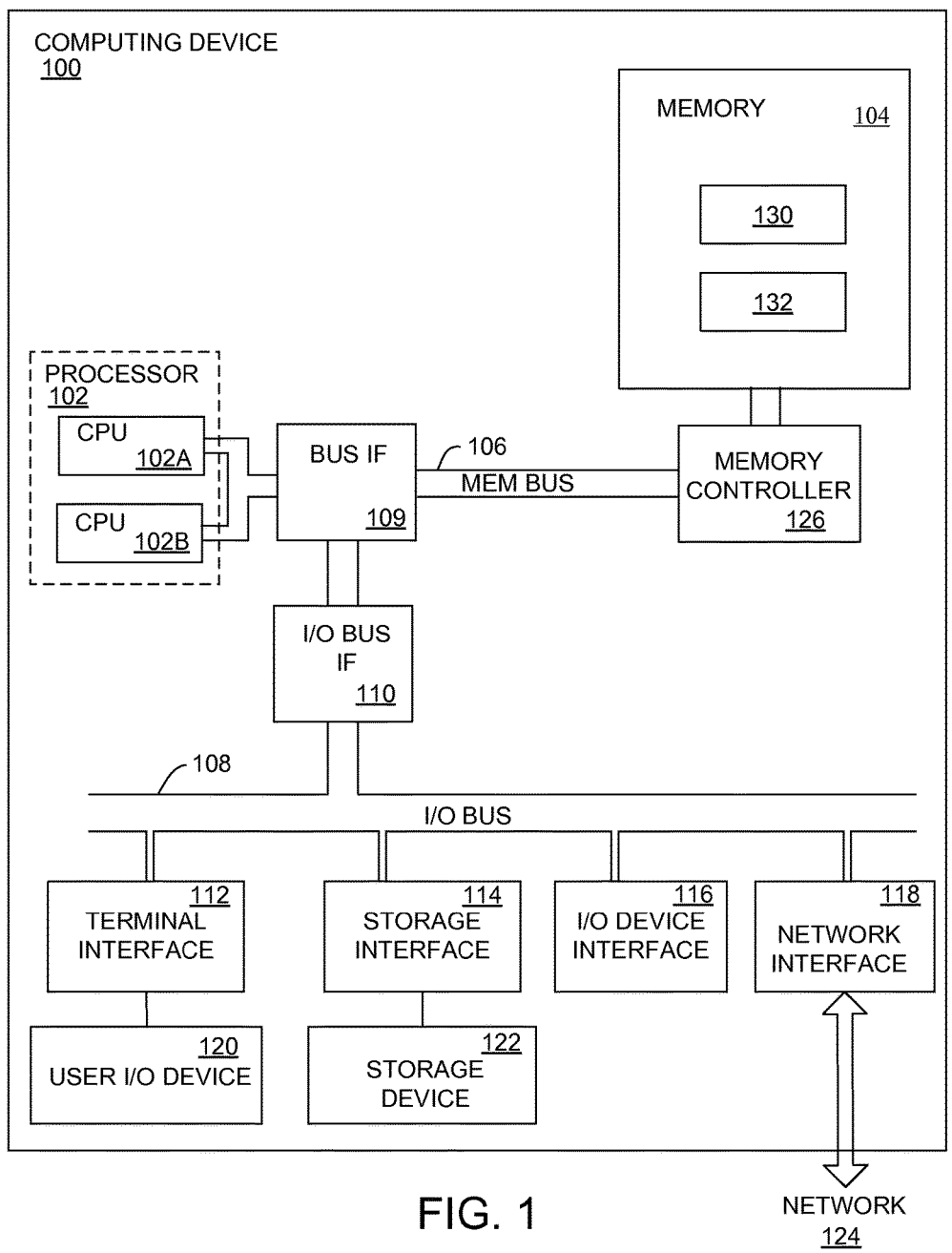
FIG. 1 is a block diagram of a computing device having a memory and a memory controller according to various embodiments.

The drawings included in the present application are incorporated into, and form part of, the specification. In the drawings and the Detailed Description, like numbers refer to like elements. The drawings illustrate embodiments of the present disclosure and, along with the description, serve to explain the principles of the disclosure. The drawings are only illustrative of certain embodiments and do not limit the disclosure. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to operations for accessing a shared resource by two or more competing access seekers, more particular aspects relate to conditional load memory access operations that include a time-out feature, which can be used to serialize memory access requests from two or more concurrently executing threads, processes, or other requestors. While the present disclosure is not necessarily limited to such applications, various aspects of the disclosure may be appreciated through a discussion of various examples using this context. Embodiments relate to conditional load memory operations that include a time-out feature implemented at a device that can reside in a memory controller or other device remote from a processor or other requestor. The device is referred to herein as a conditional load with time out (CLT) device. When a memory controller or other device receives a memory load request, the CLT device checks a condition. The CLT device may respond to a load request without delay when it determines that the condition is satisfied. The CLT device may delay a response to a load request when it determines that the condition is not satisfied. However, the CLT device does not delay the response indefinitely. The CLT device delays the response for up to the duration of a wait period. When a store to the same address specified in the load request is received prior to the wait period exceeding a time-out threshold, and the store causes the condition to be satisfied, the CLT device responds to the load request subsequent to receipt of the store. For each load issued by a typical processor (or other requestor, e.g. a DMA engine of network interface 118), the processor expects a reply within a predefined maximum-load-delay. Otherwise, the processor triggers a machine check, interrupt or other error-handling procedure. The predefined CLT time-out threshold is typically chosen to be well within the processor's maximum-load-delay, such that a CLT request does not trigger the processor's error handling procedure.

The CLT can be used to serialize memory access requests from two or more concurrently executing threads or processes. In addition, the CLT can be used to synchronize two or more concurrently executing threads or processes and for other purposes. The CLT may allow a processor or other requestor to perform other tasks during the wait period. The CLT may allow a processor or other requestor to make fewer load requests than it would otherwise make without the CLT device. Thus, the CLT disclosed herein, in various embodiments, may reduce bus traffic and improve the efficiency of processors, cores, DMA engines and other requestors. It should be appreciated, however, that some embodiments may not have these potential advantages and that these potential advantages are not necessarily required in all embodiments. FIG. 1 is a block diagram of a computing device 100 according to various embodiments. The computing device 100 is one example of a context in which embodiments may be implemented. The mechanisms and apparatus of the various embodiments disclosed herein apply equally to any appropriate computing device. The major components of the computing device 100 include one or more processors 102, a memory 104, a terminal interface 112, a storage interface 114, an Input/Output ("I/O") device interface 116, and a network interface 118, all of which are communicatively coupled, directly or indirectly, for inter-component communication via a memory bus 106, an I/O bus 108, bus interface unit ("IF") 109, and an I/O bus interface unit 110.

The computing device 100 may contain one or more general-purpose programmable central processing units (CPUs) 102A and 102B, herein generically referred to as the processor 102. In an embodiment, the computing device 100 may contain multiple processors; however, in another embodiment, the computing device 100 may alternatively be a single CPU device. Each processor 102 executes instructions stored in the memory 104 and may include one or more levels of on-board cache.

In an embodiment, the memory 104 may include a random-access semiconductor memory, storage device, or storage medium (either volatile or non-volatile) for storing or encoding data and programs. In another embodiment, the memory 104 represents the entire virtual memory of the computing device 100, and may also include the virtual memory of other computer systems coupled to the computing device 100 or connected via a network 124. The memory 104 is conceptually a single monolithic entity, but in other embodiments the memory 104 is a more complex arrangement, such as a hierarchy of caches and other memory devices. For example, memory 104 may exist in multiple levels of caches, and these caches may be further divided by function, so that one cache holds instructions while another holds non-instruction data, which is used by the processor or processors. Memory 104 may be further distributed and associated with different CPUs or sets of CPUs, as is known in any of various so-called non-uniform memory access (NUMA) computer architectures.

The memory 104 may store all or a portion of the software components 130 and data 132 shown in FIG. 1. These programs and data structures are illustrated in FIG. 1 as being included within the memory 104 in the computing device 100, however, in other embodiments, some or all of them may be on different computer systems and may be accessed remotely, e.g., via a network 124. The computing device 100 may use virtual addressing mechanisms that allow the programs of the computing device 100 to behave as if they only have access to a large, single storage entity instead of access to multiple, smaller storage entities. Thus, while the components and data shown in FIG. 1 are illustrated as being included within the memory 104, these components and data are not necessarily all completely contained in the same storage device at the same time. Further, although the components and data shown in FIG. 1 are illustrated as being separate entities, in other embodiments some of them, portions of some of them, or all of them may be packaged together.

In an embodiment, the components and data shown in FIG. 1 may include instructions or statements that execute on the processor 102 or instructions or statements that are interpreted by instructions or statements that execute on the processor 102 to carry out the functions as further described below. In another embodiment, the components shown in FIG. 1 may be implemented in hardware via semiconductor devices, chips, logical gates, circuits, circuit cards, and/or other physical hardware devices in lieu of, or in addition to, a processor-based system. In an embodiment, the components shown in FIG. 1 may include data in addition to instructions or statements.

The computing device 100 may include a bus interface unit 109 to handle communications among the processor 102, the memory 104, a memory controller 126, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. In addition, one or more of the functions provided by the bus interface unit 109 may be on board an integrated circuit that also includes the processor 102.

The memory controller 126 may include logic necessary for reading from and writing to a memory device, interfacing with the processor 102 via the memory bus 106, as well as other memory management functions. Specifically, the memory controller 126 includes logic for responding to load and store instructions. The processor 102 (or another requestor, e.g., a DMA engine of network interface 118) may issue a load or store instruction. Both load and store instructions specify an address in memory. A load instruction is a request to load data in the memory 104 into a processor register or cache. When the memory controller 126 receives a load request, it generally replies with the value at the specified address. A store instruction is a request to store data received from the processor 102 in the memory 104 at an address specified in the store instruction. When the memory controller 126 receives a store request, it stores the data received in the memory and typically does not reply to the store request. In various embodiments, the memory controller 126 may include logic for performing additional operations described below for responding to a conditional load with time-out memory requests from a processor (or other requestor, e.g., a DMA engine of network interface 118). In alternate embodiments, one or more of the functions provided by the memory controller 126 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computing device 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In another embodiment, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computing device 100 to other digital devices and computer systems, such as the database servers 104 and 108; these communication paths may include, e.g., one or more networks 124.

Although the computing device 100 shown in FIG. 1 illustrates a particular bus structure providing a direct communication path among the processors 102, the memory 104, the bus interface 109, the display system 124, and the I/O bus interface unit 110, in alternative embodiments the computing device 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computing device 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computing device 100 is a multi-user mainframe computer system, a single-user system, or a server computer or similar device that has little or no direct user interface, but receives requests from other computer systems (clients). In other embodiments, the computing device 100 may be implemented as a desktop computer, portable computer, laptop or notebook computer, tablet computer, pocket computer, telephone, smart phone, or any other suitable type of electronic device.

FIG. 1 is intended to depict the representative major components of the computing device 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
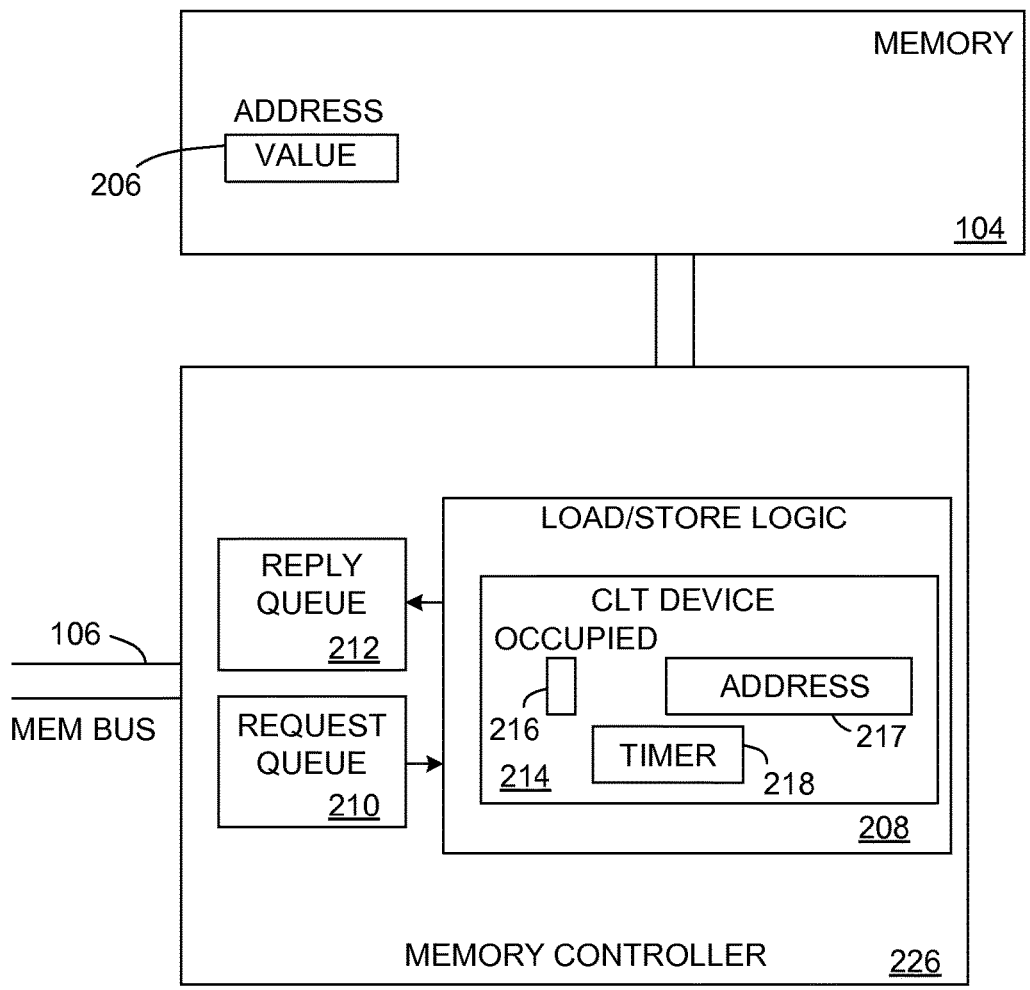
FIG. 2 is a block diagram of the memory of the computing device of FIG. 1 and a memory controller having load/store logic according to various embodiments.

FIG. 2 is a block diagram of a memory system 200 having the memory 104, a memory controller 226, and the memory bus 106 according to various embodiments. The memory controller 226 is configured to process ordinary load and store requests. In addition and according to various embodiments, the memory controller 226 is configured to recognize and process a conditional load with time-out ("CLT") request. A CLT request specifies a memory address and a condition. The condition may include any suitable logical operation, such as a comparison. In some embodiments, the condition may be evaluated with a value at a memory location, e.g., at the memory address specified in the CLT. In some embodiments, the CLT request may specify a value to be used in the logical operation. The memory controller 226 allows up to one pending CLT request. Alternative embodiments described below include a capability to allow more than one pending CLT request.

In FIG. 2, the memory 104 is shown including an example memory location 206 that a load or store request could specify. The example memory location 206 stores a value and has an address. The memory controller 226 includes load/store logic 208, a request queue 210 for storing incoming load and store requests from the memory bus 106, and a reply queue 212 for storing replies to load requests on the memory bus 106. The load/store logic 208 includes CLT device 214. The CLT device 214 may include a register or other memory 216 for storing an occupied bit. The CLT device 214 may also include a register or other memory 217 for storing an address specified in a CLT, and a timer 218. The CLT device 214 may include logic for evaluating a condition, such as compare logic. The CLT device 214 may include a memory or register for storing an operation (op) code (not shown in FIG. 2). An op code may be used to identify a particular condition when the CLT device 214 is configured to process two or more types of CLTs. The load/store logic 208 and CLT device 214 may be hardware, firmware, software, or a combination of two or more of hardware, firmware, and software. In this regard, hardware in the load/store logic 208 or CLT device 214 may include a logic circuit configured to perform various operations described herein or a hardware circuit, such as a processor, that is capable of executing program instructions stored on a computer readable storage medium.

Figure 3:
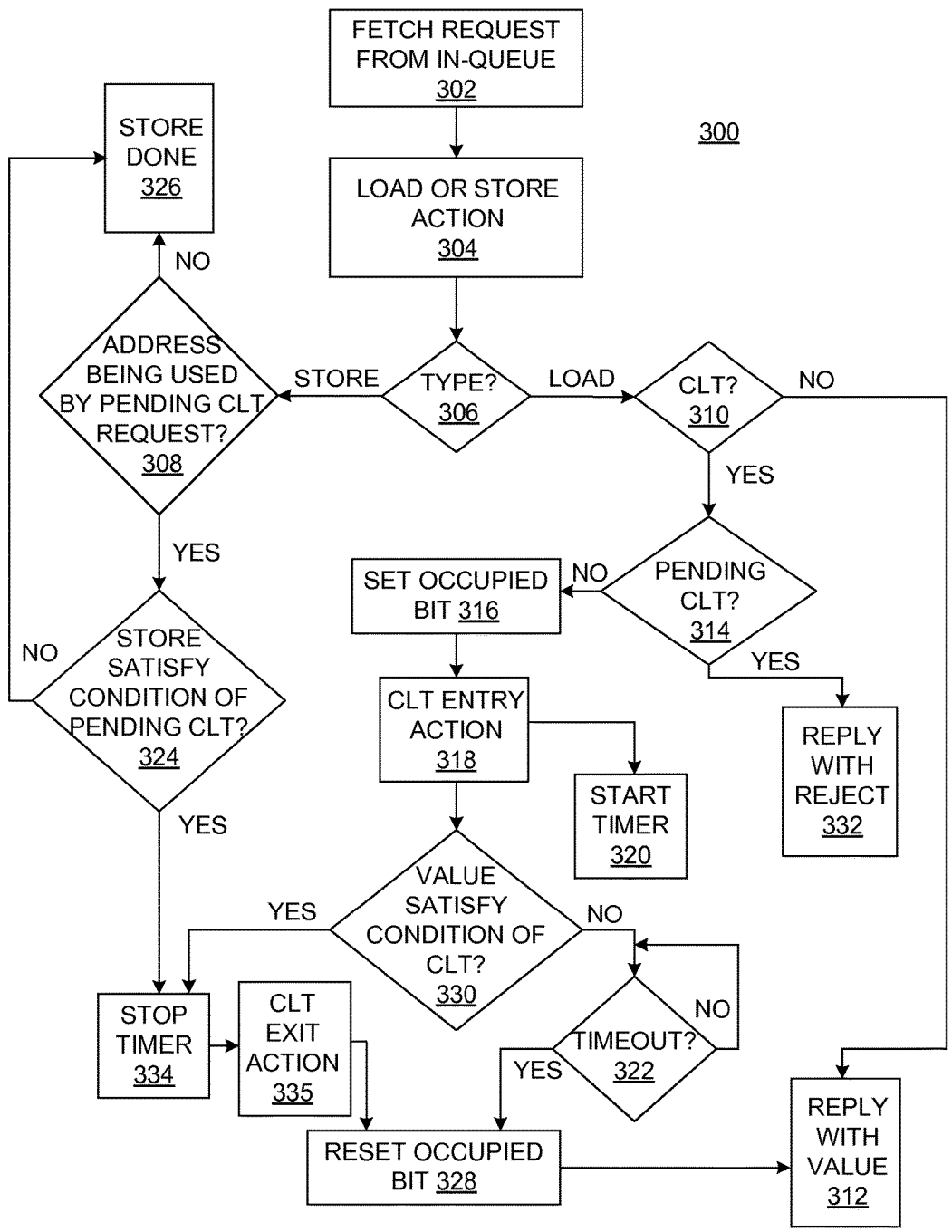
FIG. 3 is a block diagram of a process that may be performed according to various embodiments.

FIG. 3 is a flow diagram of one process 300 that may be performed by load/store logic and a CLT device according to various embodiments. However, in other embodiments, the process 300 may be performed, partially or entirely, by other components. In the description of process 300, reference is made to memory controller 226, load/store logic 208, CLT device 214, and memory 104 depicted in FIG. 2. It should be understood that the process 300 may performed by any example memory controller, load/store logic, or CLT device described herein with respect to any example memory. Moreover, the process 300 may be performed by any memory controller, load/store logic, or CLT device, which is consistent with the principles of the invention described herein, with respect to any memory.

A request from a processor via the memory bus 106 may be to load a value from a memory or store a value to a memory. In operation 302, a request is fetched from the incoming request queue. In operation 304, a load or store action is performed by the load/store logic 208. If the request is a store, a value specified in the store request is stored in the memory 104 at an address specified in the store request. If the request is a load, a value is fetched from a memory address specified in the load request. In operation 306, it may be determined whether the request is a load or a store. The determination in 306 is used to determine whether or how to invoke the CLT device 214.

If it is determined in operation 306 that the request is a load, it is determined in operation 310 whether the load is CLT-type load. If the load request is not a CLT, e.g., it is a standard load, the CLT device 214 is not invoked and a reply is sent in operation 312. This reply includes the value fetched from a memory address specified in the load request. On the other hand, if the load request is a CLT, it is determined in operation 314 whether there is a pending CLT request. Operation 314 may determine whether there is a pending CLT request by checking an occupied bit stored in the register 216. If the occupied bit is not set, a CLT request is not pending. In alternative embodiments, a CLT device can handle two or more pending CLT requests. In these alternatives, the operation 314 may determine whether there is an available slot, e.g., a capability to handle an additional pending CLT.

If it is determined in operation 314 that there is a pending CLT request, the CLT device 214 is not invoked and a reply is sent in operation 332. (This is because the memory controller 226 shown in FIG. 2 only allows up to one pending CLT request.) This reply sent in operation 332 may include an explicit indication that the currently received CLT request cannot be processed, i.e., the current CLT request is rejected. In many embodiments, operation 332 acts like 312 and returns the value fetched from the memory address. The return value implicitly indicates to software whether or not the condition has been satisfied. In many embodiments, the software operates correctly, whether or not the CLT has been used. In embodiments in which a CLT device can handle two or more pending CLT requests, a determination that there are no available slots causes a reply that rejects the CLT request.

If it is determined in operation 314 that a CLT request is not pending (or a slot is available), the occupied bit is set in operation 316. In operation 318, a CLT entry action may be performed. (As described below, some CLT requests include a CLT entry action.) In operation 320, the timer 218 may be started. In various embodiments, a timer is started when an incoming request is received or at substantially the same time that an incoming request is received. In some embodiments, the timer may start from an initial time that takes into account initial operations performed by memory controller 226 prior to reaching the operation 320. For example, the initial time may be 10 or 20 nanoseconds rather than zero.

In operation 330, it is determined whether the condition specified in the CLT is satisfied. In addition to specifying a memory address, a CLT request specifies a condition. The condition may be evaluated using a value at the memory location specified in the CLT, e.g., the memory location 206. Alternatively, the condition may be evaluated using an operand value specified in the CLT. A condition can be evaluated using a comparison operation, such as equal to, greater than, or less than. For example, a condition could be whether a first value at the memory location is equal to a second value specified in the CLT.

In operation 330, if the value satisfies the condition, the process advances to operation 334, where the timer 218 is stopped. On the other hand, if the value does not satisfy the condition, the timer 218 may be monitored in operation 322 to determine when a particular period of time from receipt of the request has elapsed, i.e., a "time-out" period or a "time-out threshold."

Operation 322 determines whether a period of time (a "wait period") beginning at receipt of the request (or start of the timer) has exceeded a time-out threshold, e.g., 0.5 microseconds. If the wait period exceeds the time-out threshold, the pending CLT times out and the process advances to operation 328. In operation 328, the occupied bit may be reset, indicating that the particular CLT request is no longer pending. The process advances from operation 328 to operation 312. In operation 312, a reply is generated. The reply may include the value at the memory address specified in the CLT request. If operations 328 and 312 are reached from a determination of a time-out in operation 322, the value returned in the reply may be the value at the memory location that did not satisfy the condition specified in the CLT. Alternatively, the value returned in the reply may be a predetermined value that indicates the CLT timed out.

In operation 330, if the value satisfies the condition, the process advances to operation 334, where the timer 218 is stopped. Continuing the example of a time-out period that is 0.5 microseconds, the timer 218 may be stopped in operation 330 after a wait period of 0.2 microseconds. From operation 334, the process advances to operation 335, where a CLT exit action may be performed. (As described below, some CLT requests include a CLT exit action.) The process advances from operation 335 to operation 328, where the occupied bit may be reset. Alternatively, if the CLT request does not include a CLT exit action, the process may advance directly to operation 328 from operation 334. From operation 328, the process advances to operation 312, where a reply is generated. If operations 328 and 312 are reached via operation 334 from a determination that the value satisfies the specified condition, the value returned in the reply may be the value at the specified memory address that satisfied the condition specified in the CLT.

Referring again to operation 306, it may be determined that the request is a store. If the request is a store, it is determined in operation 308 whether the address specified in the request is being used to evaluate a condition associated with a pending CLT. This determination may be made by determining whether the occupied bit is set for a pending CLT that specifies the same address in register 217 as that specified in the store request.

If the request is a store and specifies an address that is not being used to evaluate a condition associated with a pending CLT, the store may be considered complete (operation 326). If operation 326 is reached, the CLT device 214 is not invoked. In addition, a reply is generally not returned in a store operation.

If the request is a store and specifies an address that is being used to evaluate a condition associated with a pending CLT, the process advances to operation 324. In operation 324, it is determined whether the value specified in the store command satisfies the condition specified in the pending CLT. If the value specified in the store command does not satisfy the specified condition, the process moves to operation 326, where the store request may conclude. On the other hand, if the value specified in the store command satisfies the condition specified in the CLT, the process moves to operation 334, where the timer is stopped. The process advances to optional operation 335 (CLT exit action) and then to operation 328, where the occupied bit may be reset. The process then advances from operation 328 to operation 312, where a reply is generated for the pending CLT. If operations 328 and 312 are reached via operation 334 from a determination that the value specified in a store request satisfies a condition of a pending CLT in operation 324, the value returned in the reply may be the value specified in the store request received while the CLT was pending.

As a first example of an invocation of the operation 324, assume that prior to a store request, a CLT was received. For this CLT, it may have been determined when it was received (in operation 330) that the value specified in the CLT did not satisfy the condition specified in the CLT. The timer 218 was then monitored in operation 322 for a time-out of the pending CLT. If the store request is received before the pending CLT times out and specifies an address that is the same address as the one specified in the pending CLT, the process advances to operation 324, where it is determined whether the value specified in the store command satisfies the condition specified in the pending CLT received prior to the store.

In the above example of how operation 324 can be reached, one store request was received during the wait period for a CLT received prior to the store request. Note that in some circumstances no stores may be received during the wait period of a CLT, in which case the pending CLT times out. It should also be noted that in some circumstances two or more stores may be received during a wait period of a CLT. As a second example, if two store requests are received during the wait period after receipt of a CLT, the first store request may not satisfy the condition specified in a pending CLT, while the second store request may satisfy the condition specified in the pending CLT. Assume that at time zero a CLT is received. Upon receipt, the condition specified in the CLT is evaluated (operation 330) using the value at the memory location specified in the CLT. Assume that the condition is not satisfied and a wait period begins. During the wait period, a first store request is received. In this example, the first store requests reads the value at the memory location, increments it, and stores the incremented value. The condition specified in the CLT is evaluated again (operation 324) using the incremented value at the memory location. Assume the condition is not satisfied and the wait period continues. Still during the wait period, a second store request is received after the first store request. The second store requests reads the value at the memory location, increments it, and stores the incremented value. The condition specified in the CLT is evaluated again (operation 324) using the twice incremented value at the memory location. The condition is now satisfied and the process generates a reply indicating that the value at the memory location satisfies the specified condition as described above.

In various embodiments, the operations 302, 304, 306, 308, 310, 314, 326, and 332 may be performed by the load/store logic 208, and the other operations shown in FIG. 3 may be performed by the CLT device 214. However, this is not required and any of the shown operations may be performed by either the load/store logic 208, the CLT device 214, or other components, modules, or logic (not shown in FIG. 3).

Figure 4A:
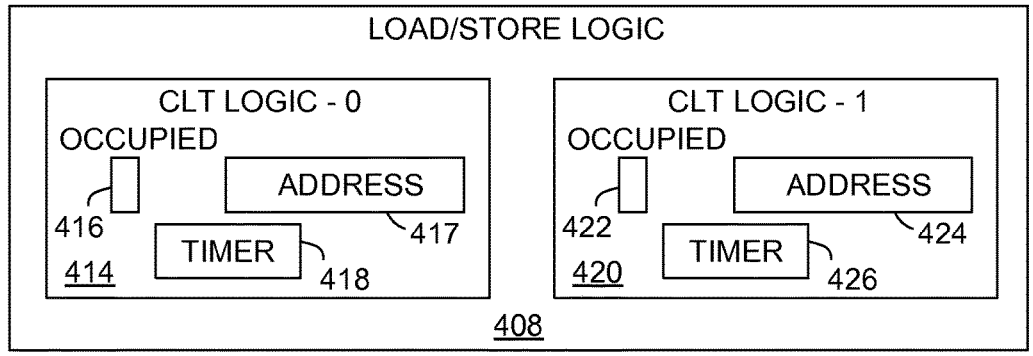
FIG. 4A is a block diagram of load/store logic according to an embodiment.

FIG. 4A is a block diagram of load/store logic 408 according to an alternative embodiment. The load/store logic 408 may be included the memory controller 226 in some embodiments. The load/store logic 408 may include two or more instances of CLT devices. In FIG. 4A, two CLT devices 414 and 420 are shown. The two CLT devices provide two slots for pending CLTs. The CLT devices 414, 420 may be similar to CLT device 214. While only two CLT devices are depicted in FIG. 4A, any number of CLT devices can be included.

The CLT devices 414 and 420 may include a register or other memory 416, 422 for storing an occupied bit, a register or other memory 417, 424 for storing an address specified in a CLT, and timers 418, 426. The CLT devices 414 and 420 may include logic for evaluating a condition, such as compare logic. The CLT devices 414, 420 may include a memory or register for storing an op code (not shown in FIG. 4A). An op code may be used to identify a particular condition when the CLT devices 414, 420 are configured to process two or more types of CLTs. The load/store logic 408 and CLT devices 414, 420 may be hardware, firmware, software, or a combination of two or more of hardware, firmware, and software.

Instances of the process 300 may be used with load/store logic 408 and CLT devices 414, 420. However, some operations of the process 300 are modified when the process is used with load/store logic 408 and CLT devices 414, 420. For example, in operation 314 it is determined whether there is a pending CLT request. A modified operation 314 may make this determination by checking the occupied bits stored in each of the registers 416, 422. The modified operation 314 determines whether there is one instance of a CLT device that does not have a pending CLT. If the occupied bit is not set in one of the registers 416 or 422, a CLT request is not pending in one instance of a CLT device and that CLT device may be used for the currently received CLT request. For example, assume the occupied bit is set in register 416, but not set in register 422. CLT device 420 can be used for the currently received CLT request.

Operations 308 and 324 of the process 300 may be modified for use with load/store logic 408 and CLT devices 414, 420. If the request is a store, it is determined in modified operation 308 whether the address specified in the request is being used to evaluate a condition associated with a pending CLT. Modified operation 308 may make this determination by determining whether the address specified in the store request is the same as an address stored in one of the registers 417 or 424. Modified operation 308 checks the occupied bit in each CLT device instance and, if the occupied bit is set, compares the address in the instance with the address specified in the store request. If the store request specifies an address that is being used to evaluate a condition associated with a pending CLT, the process advances to modified operation 324. In modified operation 324, it is determined whether the value specified in the store command satisfies the condition specified in the CLT pending in CLT device instance. For example, if the store request specifies an address that is also stored in register 417, the condition associated with the CLT pending in CLT device 414 is evaluated in modified operation 324. As a second example, if the store request specifies an address that is stored in both registers 417 and 424, the respective conditions associated with the CLTs pending in CLT devices 414 and 420 are evaluated in modified operation 324.

Figure 4B:
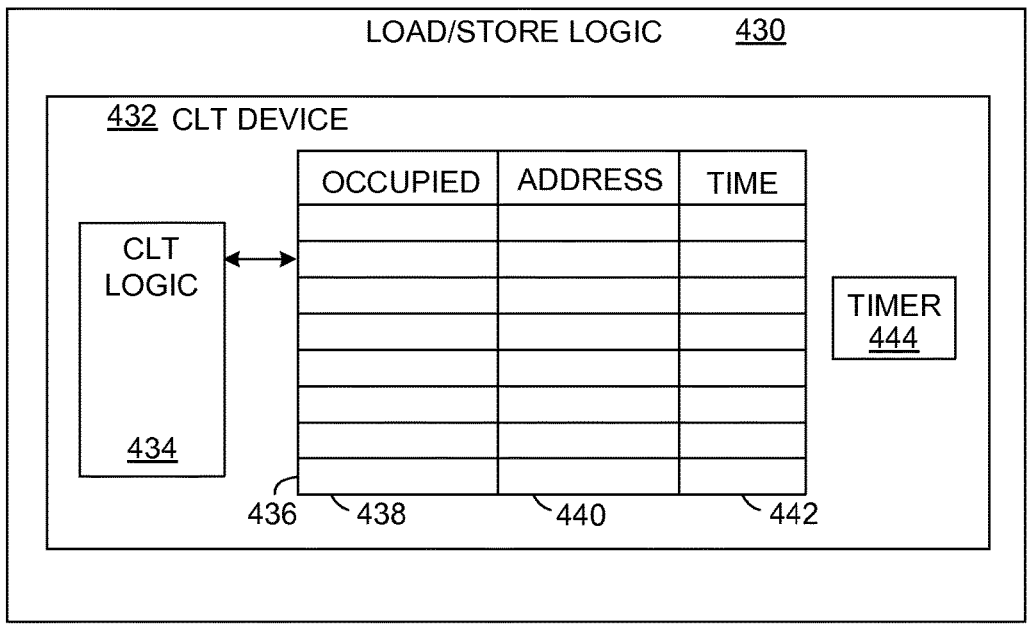
FIG. 4B is a block diagram of load/store logic according to an alternative embodiment.

FIG. 4B is a block diagram of load/store logic 430 according to an alternative embodiment. The load/store logic 430 may be included the memory controller 226 in some embodiments. The load/store logic 430 may include CLT device 432.

The CLT device 432 may include a table 436 having a first column 438 for storing an occupied bit, a second column 440 for storing an address specified in a CLT, and third column 442 for storing a time-out time. Each row of the table 436 may be used for one pending CLT. The table 436 provides eight slots for pending CLTs. While the table 436 in FIG. 4B is shown as having eight rows, any number of rows may be provided. The CLT device 432 may include one or more timers 444. The CLT device 432 may include logic for evaluating a condition, such as compare logic. The table 436 may include a column for storing an op code (not shown in FIG. 4B). An op code may be used to identify a particular condition when the CLT device 432 is configured to process two or more types of CLTs. The load/store logic 430 and CLT device 432 may be hardware, firmware, software, or a combination of two or more of hardware, firmware, and software.

An instance the process 300 may be used with load/store logic 430 and CLT device 432. However, some operations of the process 300 are modified when the process is used with load/store logic 430 and CLT device 432. For example, a modified operation 314 may determine whether there is a pending CLT request by checking the occupied column 438 for each row. Any row for which the occupied column 438 contains an occupied indication, e.g., a set occupied bit, corresponds with a pending CLT. The reply with reject operation 332 is reached only when all rows contain a set occupied bit in column 438.

The modified operation 314 determines whether there is at least one row of table 436 that does not have a pending CLT. If the occupied bit is not set in one of the rows, a CLT request is not pending and the process 300 can move to operation 316. In modified operation 316, the occupied bit is set for the row and the address specified in the CLT is stored in address column 440 for the row. In modified operation 320, a time-out time for the currently received CLT is stored in the time column 442 for the row. In one embodiment, a timer is started whenever at least one pending CLT is outstanding. When there are two more pending CLTs, a comparator is provided for each occupied row, i.e., each pending CLT. The respective comparators compare the time-out time stored in the time column 442 for the row with the output of the timer to determine when a CLT times out. In another embodiment, a timer may be provided for each row.

Operations 308 and 324 of the process 300 may be modified for use used with load/store logic 430 and CLT device 432. If the request is a store, it is determined in modified operation 308 whether the address specified in the request is being used to evaluate a condition associated with a pending CLT. Modified operation 308 may make this determination by determining whether the address specified in the store request is the same address as any of the addresses stored in address column 440. Modified operation 308 checks the occupied bit for each row and, if the occupied bit is set, compares the address in column 440 of the row with the address specified in the store request. If the store request specifies an address that is being used to evaluate a condition associated with a pending CLT, the process advances to modified operation 324. In modified operation 324, it is determined whether the value specified in the store command satisfies the condition specified in the pending CLT for the occupied row. For example, if the store request specifies an address that is also stored in a first row, the condition associated with the CLT pending in the first row is evaluated in modified operation 324. As a second example, if the store request specifies an address that is stored in both first and second rows, the respective conditions associated with the CLTs pending in the first and second rows are evaluated in modified operation 324. If a pending CLT times out, a modified operation 328 resets the occupied bit in column 438 only for the row associated with the timed-out CLT. Similarly, if a store satisfies a condition of a pending CLT, a modified operation 328 resets the occupied bit in column 438 only for the row associated with the timed-out CLT.

Figure 11:
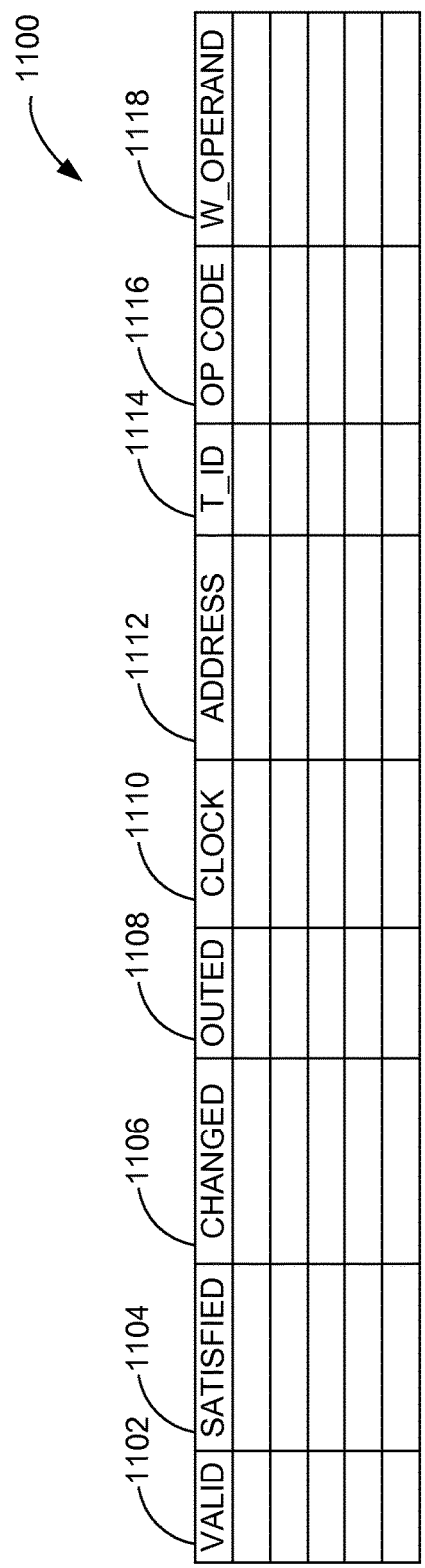
FIG. 11 shows a table of pending conditional load with time-out requests according to various embodiments.

FIG. 11 shows a table 1100 of pending (or outstanding) CLT requests according to various embodiments. The table 1100 may be used in a CLT device similar to the CLT device 432 shown in FIG. 4B. Like the table 436, each row of the table 1100 may be used for one pending CLT. While the table 1100 in FIG. 11 is shown as having five rows, any number of rows may be provided. The table 1100 includes a valid column 1102, a satisfied column 1104, a changed column 1106, an outed column 1108, a clock column 1110, an address column 1112, a T_ID column 1114, an op code column 1116, and a w_operand column 1118. The valid column 1102 corresponds with the occupied bit or column described above. For example, if the valid column contains a 1, the row contains a pending (or outstanding) CLT. The satisfied column 1104 contains an indication of whether the condition associated with the CLT has been satisfied. For example, a 1 in the satisfied column indicates that the condition has been satisfied and reply will be issued. The changed column 1106 includes an indication whether the value at the memory address specified in the CLT has changed. For example, a 1 in the changed column indicates that the value at the memory address has changed and the condition associated with the CLT is to be checked. The outed column 1108 stores an indication of whether a request has timed out. For example, a 1 in the outed column indicates that the CLT has timed out and a reply is to be issued. The clock column 1110 is for a running counter that is initialized when a CLT is added to the table 1100. The clock column 1110 corresponds with the timers described above. When the clock overflows, i.e., a wait period exceeds a time-out threshold, the outed bit in column 1108 is set. The address column 1112 stores an address in memory associated with a CLT. The T_ID column 1114 is where the thread ID of the thread that made the CLT request is stored. The op code column 1116 stores the op code associated with CLT request. Each CLT instruction has an op code, which identifies the condition or conditions associated with CLT. The w_operand column 1118 is used for storing an operand provided with some types of CLT requests.

FIGS. 5 and 6 depict tables of CLT instruction examples according to various embodiments. As mentioned, a CLT request specifies a memory address and a condition, which may be any suitable logical operation. (The condition may be inferred from the op code associated with the instruction.) In addition, the CLT request may specify a value to be used in the logical operation. A CLT request is made to a memory as the result of a CLT instruction being executed. Possible CLT instructions that can be used with a CLT device according to the principles described herein are not limited to the example CLT instructions presented in FIGS. 5 and 6. The example CLT instructions are representative, but any suitable CLT instruction can be used with a CLT device according to the principles described herein. In the following discussion, the example CLT instructions are grouped according to whether the CLT instruction changes the contents of a memory.

FIG. 5 depicts a table of CLT instruction examples according to various embodiments. The example CLT instructions in FIG. 5 do not change the content of the memory location specified in the instruction. The left-most column lists one CLT instruction example in each row. Moving from left to right, the AMO Store Action column lists any atomic action that can occur in operation 304 of process 300 depicted in FIG. 3. The Entry Action column lists any CLT entry action that can occur in operation 318 of the process 300. The Reply Condition column lists the conditions specified by the respective CLT instructions. The "If satisfied, EXIT AMO" column indicates the CLT "EXIT AMO" action 335 executed if the condition specified by the CLT instruction is satisfied in operation 330 or 324. The Reply value column lists the value returned in the reply when the condition specified in the CLT instruction is satisfied.

The CLT instruction examples in FIG. 5 may be used like a conventional load instruction. This is because these example CLT instructions do not change the content of the memory location specified in the instruction. Accordingly, these example CLT instructions can be issued speculatively. In addition, the result of such a CLT instruction in FIG. 5 can be cached.

FIG. 6 depicts a table of CLT instruction examples according to various embodiments. These CLT instruction examples in FIG. 6 can change the content of a specified memory location. The left-most column lists one CLT instruction example in each row. Moving from left to right, the AMO Store Action column lists any atomic action that can occur in operation 304 of process 300 depicted in FIG. 3. The Entry Action column lists any CLT entry action that can occur in operation 318 of the process 300. The Reply Condition column lists the conditions specified by the respective CLT instructions. The "If satisfied, EXIT AMO" column indicates the CLT "EXIT AMO" action 335 executed if the condition specified by the CLT instruction is satisfied in operation 330 or 324. The Reply value column lists the value returned in the reply when the condition specified in the CLT instruction is satisfied.

According to various embodiments, a CLT instruction may be an "atomic" memory operation, i.e., the value at a memory at the address specified in a CLT instruction cannot be changed by another access seeker between the time when it is determined that the condition specified in the CLT instruction is satisfied and the time reserved for a CLT exit action (operation 335).

The CLT instruction examples in FIG. 6 may be not used like a conventional load instruction. This is because these example CLT instructions can change the content of the memory location specified in the instruction. Accordingly, these example CLT instructions should be treated like an atomic memory operation. For example, consider the "decrementOnZero_Load(addr)" instruction. The CLT result cannot be cached, since each decrementOnZero_Load(addr) changes the value at the memory location. In addition, a decrementOnZero_Load(addr) instruction cannot be issued speculatively because the value at the memory location is inadvertently changed when a misspeculation occurs.

A memory location can be any desired size. Accordingly, the value at a particular address, denoted "value(addr)," can be 1, 2, 4, 8, or other number of bytes specified in a CLT request. Similarly, reqOp and wOp can be any number of bytes.

Some CLT instructions are associated with an operand. The abbreviation "wOp" denotes an operand associated with a pending CLT request. The operand may supplied by software that includes the CLT instruction. For example, the On_EQOperand_Load(addr, reqOp) instruction supplies an operand "reqOp" as a parameter of the CLT instruction. The entry action in the table in FIG. 5 assigns the value of reqOp to wOp. The operand wOp may be stored internally in the CLT device in association with a pending CLT request. For example, the operand wOp associated with a pending CLT may be stored in table 436 (See FIG. 4B) or in column 1118 of table 1100 (FIG. 11), according to various embodiments. In addition to being supplied by software, an operand may be obtained from memory. The "incrementTicketOnTurn_Load(addr) is an example of an operand may be obtained from memory. As can be seen in the table in FIG. 6, the entry action assigns the "old" value at the memory address specified in the instruction to the operand wOp associated with the request.

Figure 7:
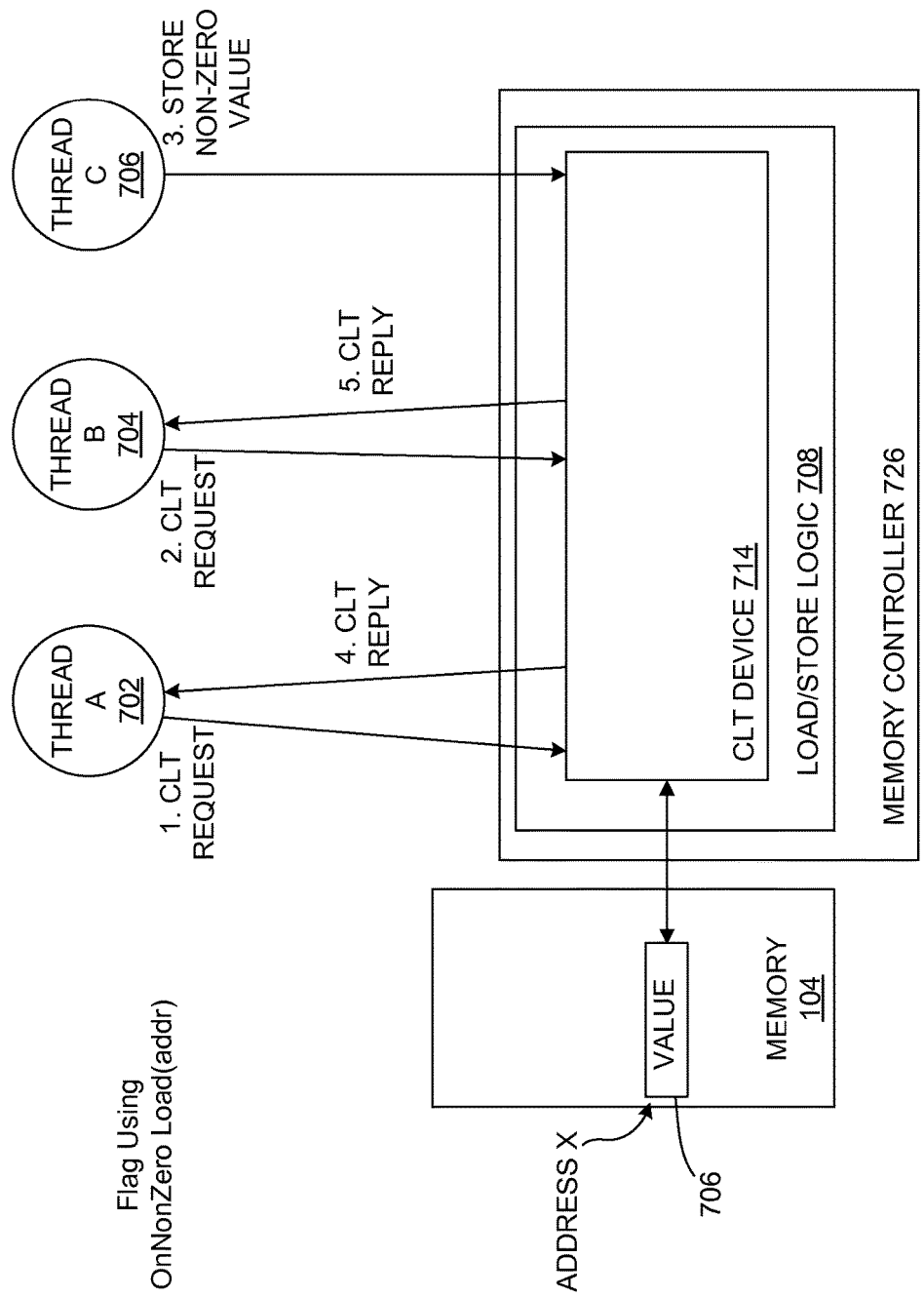
FIG. 7 is a block diagram of an example of using of an OnNonZero_Load(addr) instruction with a conditional load with time-out device according to various embodiments.

FIG. 7 is a block diagram of an example of using of the OnNonZero_Load(addr) instruction with a CLT device according to various embodiments. FIG. 7 shows the memory 104, a memory controller 726, load/store logic 708, and a CLT device 714. An example memory location 706 having an address X is depicted within the memory 104. In the example of FIG. 7, threads A (702), B (704), and C (706) are shown. The threads A, B, and C may be components of a software process executing on a Simultaneous Multi-Threading (SMT) processor core. The threads A, B, and C may be concurrently executing on the SMT core. The software process requires that each of the threads A and B not progress past a particular synchronization point until a particular event occurs. CLT instructions within threads A and B may be used with a CLT device to prevent the threads from progressing past the particular point until the particular event occurs.

Specifically, the software process uses the value at the memory location having address X to indicate whether or not the event has occurred. Each thread 702 and 704 includes a CLT instruction in its code at a point at which it is desired to pause the thread until the event occurs. The CLT instructions are OnNonZero_Load(addr) instructions that specify the same address X. The onNonZero load condition compares the value at memory location X with zero. If the value does not equal zero, a reply that includes the non-zero value is returned. The non-zero value indicates to software that the event has occurred and thus the thread can progress past this point. If the value equals zero, a wait period begins. If the value at the memory location is changed to a non-zero value during the wait period, a reply that includes the non-zero value is returned. On the other hand, if the value at the memory location is a zero value at the end of the wait period, the CLT times out and a reply that includes the zero value is returned. The zero value indicates to software that the event has not occurred and thus the thread does not progress past this point. So typically the thread then retries the CLT.

Prior to time 1, the software process stores a zero value at location X. At time 1, the thread A reaches the synchronization point and issues a CLT OnNonZero_Load( ) request specifying address X. The CLT device 714 determines that the condition is not satisfied because the value at location X is equal to zero and starts a first wait period for the CLT request from thread A. At time 2, the thread B reaches the synchronization point and issues a CLT OnNonZero_Load( ) request specifying address X. The CLT device 714 determines that the condition is not satisfied because the value at location X is equal to zero and starts a second wait period for the CLT request from thread B. At time 3, the thread C issues a store request specifying address X and a non-zero value. For example, the particular event may have occurred, which in turn triggers thread C to issue the store request. Time 3 is subsequent to times 1 and 2 but prior to the first and second wait periods exceeding their respective time-out thresholds. When the CLT device 714 processes the store request from thread C, it stores the non-zero value at address X and determines whether there is a pending CLT associated with address X. The CLT device 714 determines that there are two pending CLTs associated with address X. The CLT device 714 determines that storing a non-zero value at address X satisfies the condition associated with the pending CLT request from thread A and causes a reply to thread A to be sent at time 4. In addition, the CLT device 714 determines that storing a non-zero value at address X satisfies the condition associated with the pending CLT request from thread B and causes a reply to thread B to be sent at time 5. The replies to threads A and B may include the non-zero value at the memory location X. It is not essential that the CLT device 714 issue a reply to thread A before issuing a reply to thread B. In an alternative embodiment, the CLT device 714 issues a reply to thread B before issuing a reply to thread A.

In the example of FIG. 7, threads A and B are paused until thread C stores a non-zero value to memory location X. Without the CLT device 714, threads A and B would be required to repeatedly load the memory location 706. Thus, the CLT device 714 can reduce the amount of loads required by software threads. In the example of FIG. 7, if the value at memory location X had not been set to a non-zero value before the time-out threshold associated with thread A had been reached, thread A would time out and reply would have been sent. That reply to thread A would include the zero value at location X. Process A upon receipt of the reply could then retry the CLT or take other action as needed. If the time-out period is 1 microsecond, this could correspond with polling location X about every 1 microsecond. In comparison, the polling by thread A using a standard load might occur on the order of every 10-20 nanoseconds (assuming a GHz processor clock).

Figure 8:
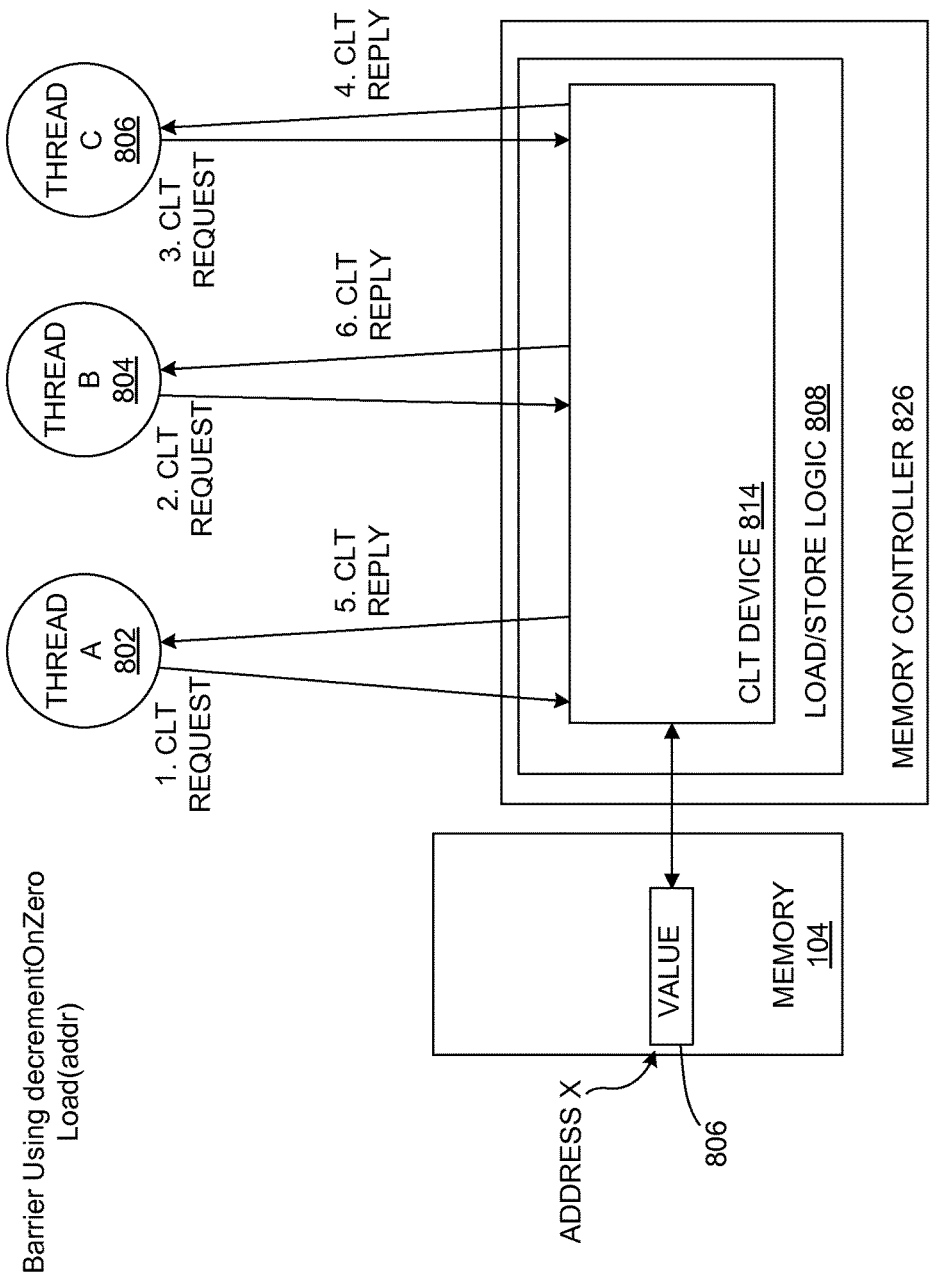
FIG. 8 is a block diagram of an example of using of a decrementOnZero_Load(addr) instruction with a conditional load with time-out device according to various embodiments.

FIG. 8 is a block diagram of an example of using of the decrementOnZero_Load(addr) instruction with a CLT device according to various embodiments. FIG. 8 shows the memory 104, a memory controller 826, load/store logic 808, and a CLT device 814. An example memory location 806 having an address X is depicted within the memory 104. In the example of FIG. 8, threads A (802), B (804), and C (806) are shown. The threads A, B, and C may be components of a software process executing on a Simultaneous Multi-Threading (SMT) processor core. The threads A, B, and C may be concurrently executing on the SMT core. The software process requires that the threads A, B, and C be synchronized when each thread reaches a particular point of execution. The decrementOnZero_Load(addr) instruction may be used by each thread to implement a barrier. The example of FIG. 8 shows how CLT instructions within threads A, B, and C may be used with a CLT device to provide a barrier that prevents any of the threads from progressing past the respective particular points in the threads until all of the threads have reached the particular point.

In the example of FIG. 8, the value at address X is initialized to a number that is equal to the number of threads to be synchronized by the barrier. At time 1, a first decrementOnZero_Load(addr) request specifying address X is received from thread A. The CLT device 814 decrements the value at location X from 3 to 2. The CLT device 814 determines that the condition specified in the first request is not satisfied because the value at location X is not equal to zero and starts a first wait period for the CLT request from thread A. At time 2, a second decrementOnZero_Load(addr) request specifying address X is received from thread B. The CLT device 814 decrements the value at location X to 1. The CLT device 814 determines that the condition specified in the second request is not satisfied because the value at location X is not equal to zero and starts a second wait period for the CLT request from thread B. At time 3, a third decrementOnZero_Load(addr) request specifying address X is received from thread C. The CLT device 814 decrements the value at location X to 0. The CLT device 814 determines that the conditions specified in the first, second, and third requests are satisfied because the value at location X is equal to zero and releases the barrier by issuing a reply to thread C at time 4, a reply to thread A at time 5, and a reply to thread B at time 6. Note the replies may be in any order. This example assumes that the barrier is released prior to the first and second wait periods exceeding respective time-out thresholds. Otherwise, on timeout the thread receives a non-zero reply value indicating that the thread should retry the CLT until it replies with value 0.

Figure 9:
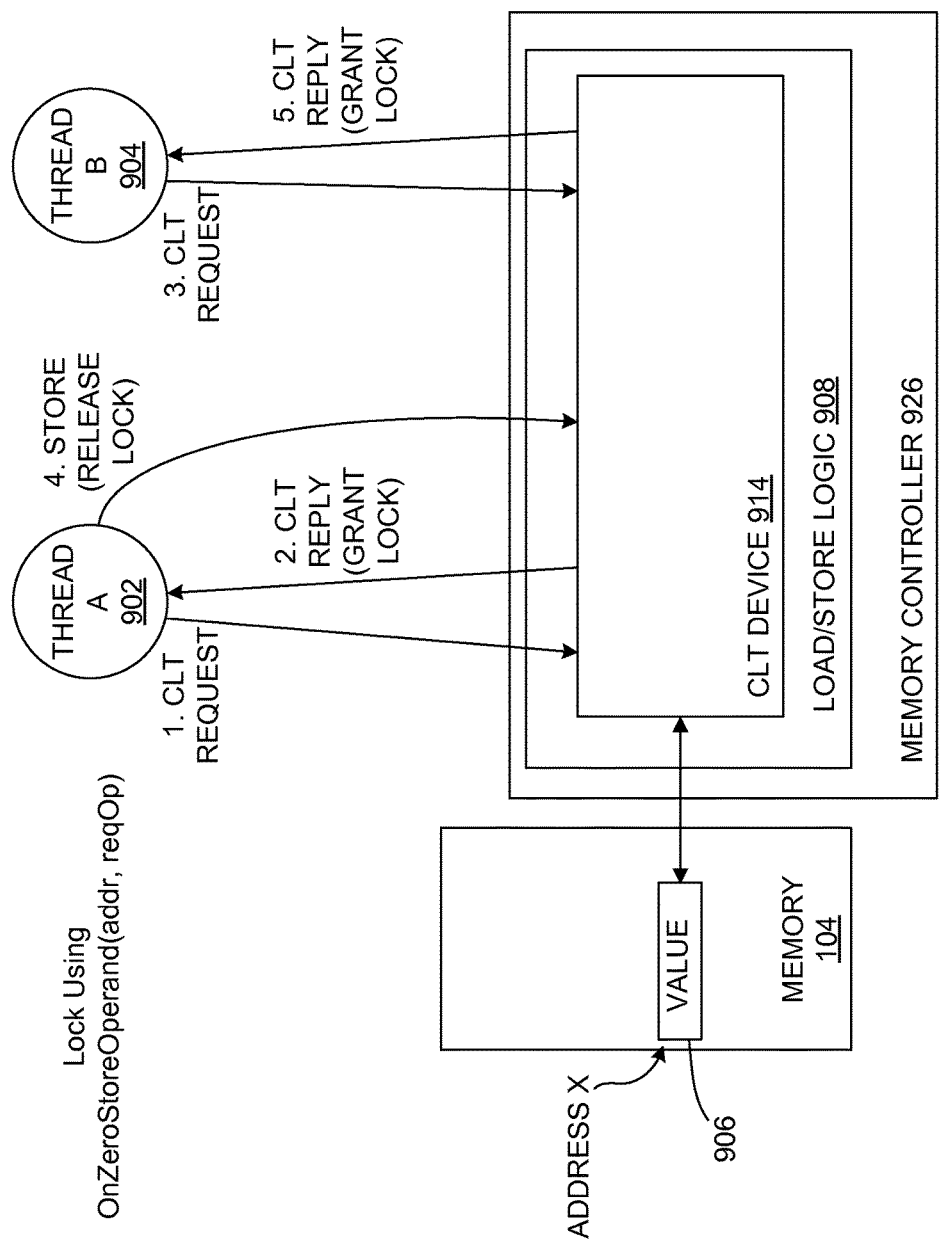
FIG. 9 is a block diagram of an example of using of an OnZeroStoreOperand_Load(addr, reqOp) instruction with a conditional load with time-out device according to various embodiments.

FIG. 9 is a block diagram of an example of using the OnZeroStoreOperand_Load(addr, reqOp) instruction with a CLT device according to various embodiments. FIG. 9 shows the memory 104, a memory controller 926, load/store logic 908, and a CLT device 914. An example memory location 906 having an address X is depicted within the memory 104. In the example of FIG. 9, threads A (902) and B (904) are shown. The threads A and B may be components of a software process executing on a Simultaneous Multi-Threading (SMT) processor core. The threads A and B may be concurrently executing on the SMT core. The software process requires that the threads A and B acquire a lock before accessing a shared resource, such as a shared data structure. CLT instructions within threads A and B may be used with a CLT device for a thread to request and obtain a lock.

In the example of FIG. 9, the value at address X is initialized to zero. At time 1, a first OnZeroStoreOperand (addr, reqOp) request specifying address X is received from thread A. The operand, reqOp, specified in the first request is a unique, non-zero value, such as a thread ID. The CLT request for thread A is effectively a request for a lock on the shared resource. The CLT device 914 determines that the CLT condition is satisfied because the value at location X is equal to zero and thus stores the operand specified in the first request at address X, thereby granting the lock to thread A. At time 2, the CLT device 914 issues a reply that includes the value of the operand stored at address X, notifying thread A that the lock is granted. At time 3, a second OnZeroStoreOperand(addr, reqOp) request specifying address X is received from thread B. The operand, reqOp, specified in the second request from thread B is a unique, non-zero value, such as B's thread ID. The CLT request for thread B is effectively a request for a lock on the shared resource. The CLT device 914 determines that the CLT condition is not satisfied because the value at location X is not equal to zero and starts a first wait period for the CLT request from thread B. At time 4, the CLT device 914 receives a store request from thread A. The store request specifies address X and a value of zero. The store request from thread A notifies the CLT device 914 that thread A is releasing its lock. The CLT device 914 stores zero at location X and determines whether there are any pending CLTs. If the wait period for thread B has not timed out, the CLT device 914 determines that the CLT condition associated with thread B is satisfied and issues a reply to thread B at time 4. In addition, the operand specified in the second request is stored at address X. The reply to thread B includes the value at address X (thread B's ID), which notifies thread B that its lock request is granted. If the wait period for thread B has timed out, the reply to thread B includes the value at address X (thread A's ID), which notifies thread B that its lock request is not granted. Typically, thread B would retry the CLT.

Figure 10:
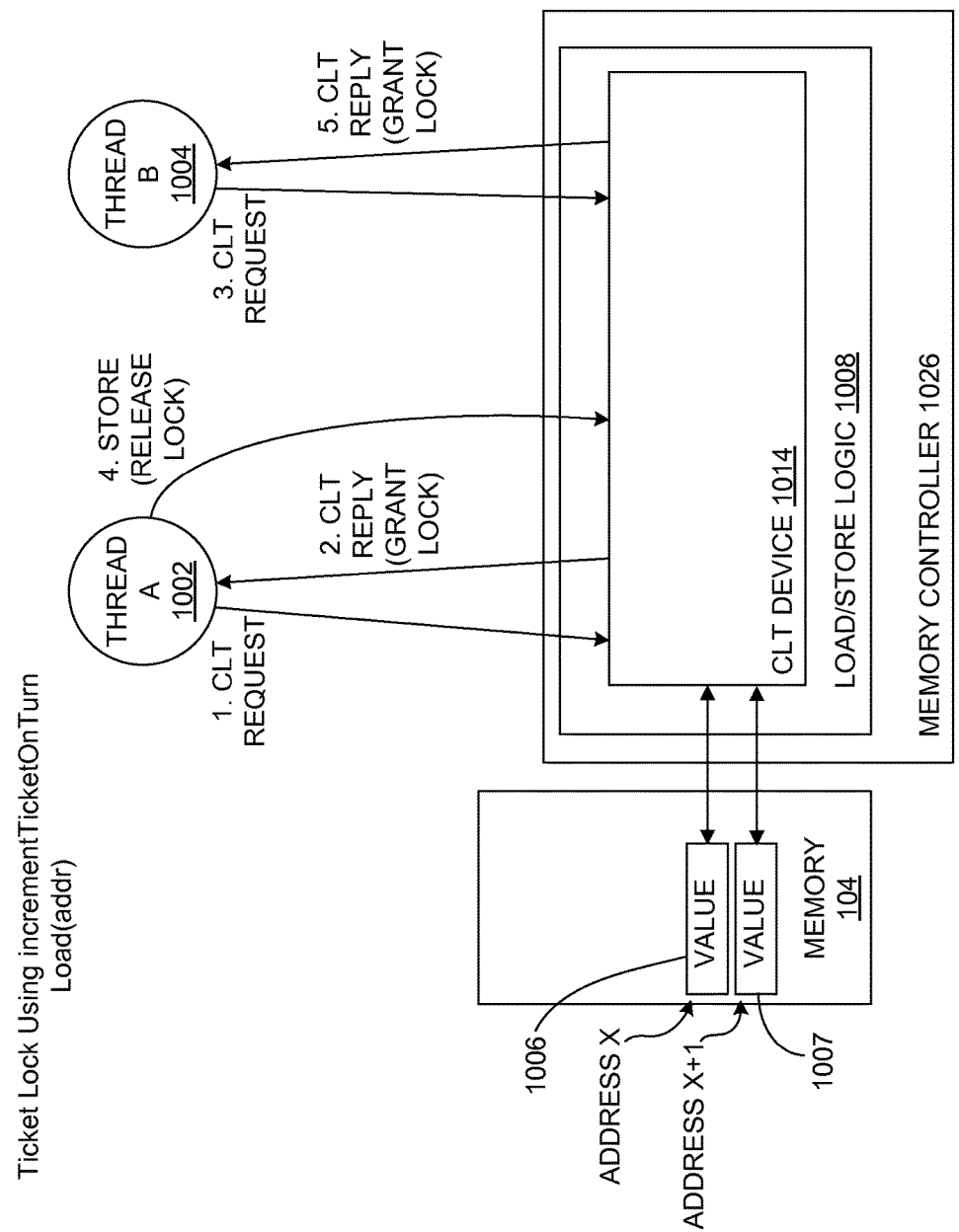
FIG. 10 is a block diagram of an example of using of an incrementTicketOnTurn_Load(addr) instruction with a conditional load with time-out device according to various embodiments.

FIG. 10 is a block diagram of an example of using the incrementTicketOnTurn_Load(addr) instruction with a CLT device according to various embodiments. FIG. 10 shows the memory 104, a memory controller 1026, load/store logic 1008, and a CLT device 1014. Example memory locations 1006, 1007 having addresses X and X+1 are depicted within the memory 104. In the example of FIG. 10, threads A (1002) and B (1004) are shown. The threads A and B may be components of a software process executing on a Simultaneous Multi-Threading (SMT) processor core. The threads A and B may be concurrently executing on the SMT core. The software process requires that the threads A and B acquire a lock before accessing a shared resource, such as a shared data structure. In the example shown in FIG. 10, the CLT device implements a ticket lock scheme. In a ticket lock scheme, a requestor obtains a ticket value and then monitors a turn counter until the turn counter reaches the ticket value. In the example of FIG. 10, the software process requires threads A and B to acquire a lock using a ticket lock scheme, but neither the threads A nor B (nor any other component of the software process) are required to monitor a turn counter. The CLT device monitors a turn counter on behalf of a thread or other software process.

In the example of FIG. 10, the CLT instructions within threads A and B are the CLT instruction incrementTicketOnTurn_Load(addr). Two memory locations are used. In the example of FIG. 10, the value at address X may be a ticket counter value. The value at address X+1 may be a ticket turn value. The values at addresses X and X+1 are each initialized to one. At time 1, a first incrementTicketOnTurn_Load(addr) request specifying address X is received from thread A. This CLT request for thread A is effectively a request for a lock on the shared resource. The CLT device 1014 determines that the CLT condition for the first request is satisfied because the value at location X is equal to the value at location X+1, i.e., the ticket counter value equals to the ticket turn counter. Effectively, thread A is given a ticket value of one. The CLT device 1014 increments the value at location X (ticket counter value) to 2. At time 2, the CLT device 1014 issues a reply notifying thread A that the lock is granted. The reply to thread A includes the negative ticket value of one given to thread A. The negative value indicates that the turn has been obtained. At time 3, a second incrementTicketOnTurn_Load(addr) request specifying address X is received from thread B. This CLT request from thread B is effectively a request for a lock on the shared resource. The CLT device 1014 determines that the CLT condition is not satisfied because the value at location X is not equal to the value at location X+1, i.e., the ticket counter value of 2 is not equal to the ticket turn counter value of 1. Effectively, thread B is given a ticket value of 2. Because the CLT condition is not satisfied, the CLT device 1014 starts a first wait period for the CLT request from thread B. At time 4, the CLT device 1014 receives a store request from thread A. The store request specifies address X and specifies a value 2 for the next turn, which is the ticket value of 1 that thread A was given plus 1. The store request from thread A is received before the first wait period of thread B exceeds a time out threshold. The store request from thread A notifies the CLT device 1014 that thread A is releasing its lock. The CLT device 1014 stores the turn value of 2. The CLT device determines whether there are any pending CLTs. The CLT device 1014 determines that the thread B is a pending CLT. The CLT device 1014 determines whether the CLT condition associated with thread B is satisfied, namely, it determines whether the value at location X is equal to the value at location X+1. Because the value at location X (ticket counter value) is 2 and the value at location X+1 (ticket turn value) is 2, the condition is satisfied. The CLT device 1014 issues a reply to thread B at time 5. This reply to thread B includes the negative ticket value of 2 given to thread B, which notifies thread B that its lock request is granted. If the store request from thread A is received after the first wait period of thread B times out, the CLT device 1014 sends a reply to thread B with a positive ticket value indicating that its lock request was not granted. In this case, thread B would be required to retry using On_EQOperand(addr+1, 2), which will return when turn 2 is available.

Figure 12:
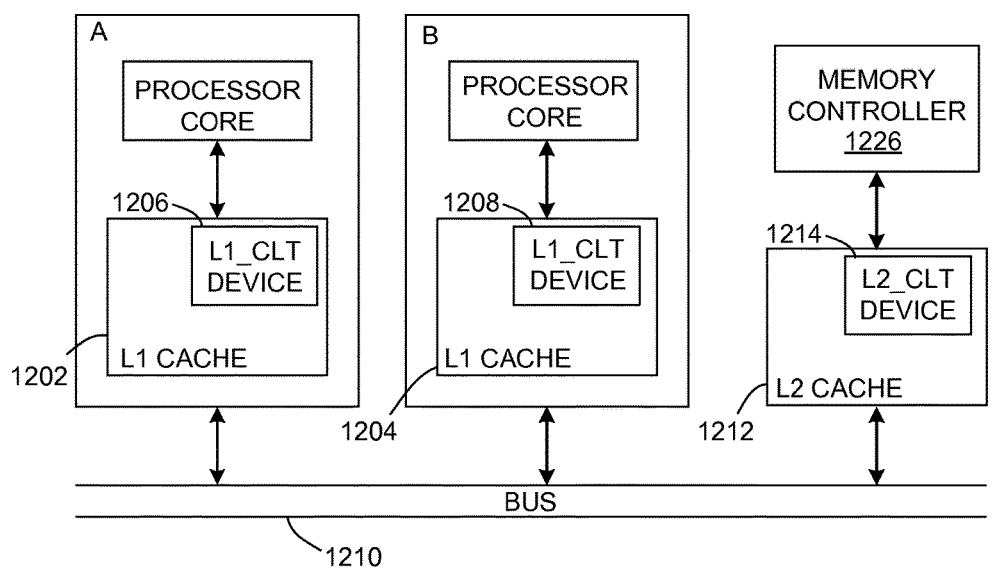
FIG. 12 is a block diagram of a multi-core system in which two or more conditional load with time-out devices are simultaneously employed in two or more caches according to various embodiments.

A CLT device according to the principles described herein may be employed in any cache or memory within a memory hierarchy. In addition, two or more CLT devices according to the principles described herein may be employed at the same time within a memory system or a memory hierarchy. When two or more CLT devices are used at the same time, they may be configured to cooperate with one another. FIG. 12 is a block diagram of a multi-core system in which CLT devices are simultaneously employed in L1 and L2 caches according to various embodiments.

In FIG. 12, the processor A includes a core and a semi-private L1 cache 1202. Similarly, the processor B also includes a core and has a semi-private L1 cache 1204. The respective L1 caches 1202, 1204 include CLT devices 1206 and 1208. Cores A and B are coupled via bus 1210 with each other and with an L2 cache 1212. The L2 cache 1212 includes a CLT device 1214 and is coupled with a memory controller 1226. The memory controller 1226 is coupled with a memory (not shown in FIG. 12).

In a first example with reference to FIG. 12, assume an initial state in which a cache line X in the L1 cache 1204 of processor B is in an exclusive state. In addition, assume that the value 0 is in the cache line X of L1 cache 1204. A software process executing on processor A issues a CLT request to L1 CLT device 1206. Specifically, CLT device 1206 receives an onNonZeroLine_Load(X) request from processor A. In an embodiment, the CLT device 1206 determines that line X is in the L1 cache 1204 and forwards the CLT request to CLT device 1208. The CLT device 1208 determines if the value at line X is not equal to zero. Because the value equals zero, a wait period begins. If a software process executing on processor B stores a non-zero value at cache line X of L1 cache 1204 during the wait period, the CLT device 1208 issues a reply that includes the non-zero value to the CLT device 1206. This reply includes the non-zero value at line X. The CLT device 1206 then forwards the reply to the processor A. On the other hand, if the value at cache line X is still zero at the end of the wait period, the CLT times out and the CLT device 1208 sends a reply that includes the zero value to the CLT device 1206, which it forwards to processor A. On receiving the reply value 0, processor A can retry the onNonZeroLine_Load(X).

In another example with reference to FIG. 12, assume the L1 caches 1202, 1204 are write-through caches and the L2 cache 1212 implements a directory based cache coherency scheme across the multiple processor cores. Assume an initial state in which a cache line Y is not contained in L1 cache 1202. A software process executing on processor A issues a CLT request to L1 CLT device 1206. Specifically, CLT device 1206 receives an onNonZeroLine_Load(Y) from processor A. In an embodiment, the CLT device 1206 forwards the CLT request to CLT device 1214 in L2 cache 1212. The CLT device 1214 determines from its coherency table and memory controller that cache line Y stores a value equal to zero and initiates a wait period for the CLT. If a software process executing on processor B or some other core or device stores a non-zero value at cache line Y during the wait period, the CLT device 1214 issues a reply to the CLT device 1206. This reply includes the non-zero value at cache line Y. The CLT device 1206 then forwards the reply to the processor A. On the other hand, if the value at cache line Y is still zero at the end of the wait period, the CLT times out and a reply that includes the zero value is sent to the CLT device 1206, which it forwards to processor A.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for responding to memory requests, comprising:
   receiving a first memory load request by a conditional load with time out (CLT) device at a first time, the first memory load request specifying a first condition and a first memory address;
   performing a first determination of whether the first condition is satisfied;
   starting a timer at the CLT device to determine a wait period when the first condition is not satisfied;
   responding to the first memory load request with a reply, wherein the reply indicates that the first condition is not satisfied when the duration of the wait period exceeds a time-out threshold; and
   when the first condition is not satisfied:
      receiving a first memory store request by the CLT device at a second time subsequent to the first time and prior to the wait period exceeding the time-out threshold, the first memory store request specifying the first memory address and a value;
      storing the value at the first memory address;
      performing a second determination of whether the first condition is satisfied; and
      responding to the first memory load request with a reply, wherein the reply indicates that the first condition is satisfied when the second determination is that the first condition is satisfied.

2. The method of claim 1, wherein the value specified by the first memory store request is used in the second determination of whether the first condition is satisfied.

3. The method of claim 1, wherein the reply indicating that the first condition is satisfied when the second determination is that the first condition is satisfied includes the value specified by the first memory store request.

4. The method of claim 1, wherein the reply indicates that the first condition is satisfied when the first condition is satisfied.

5. The method of claim 1, wherein the reply includes a value at the first memory address.

6. The method of claim 1, wherein a value at the first memory address is used in the first determination of whether the first condition is satisfied.

7. The method of claim 1, wherein the first memory load request includes an operand and the operand is used in the first determination of whether the first condition is satisfied.

8. The method of claim 1, wherein a first value at the first memory address and a second value at a second memory address are used in the first determination of whether the first condition is satisfied.

9. A conditional load with time out (CLT) device for responding to memory requests, comprising:
   a timer;
   a memory to store a pending memory load request; and
   a logic circuit to:
      receive a first memory load request at a first time, the first memory load request specifying a first condition and a first memory address;
      perform a first determination of whether the first condition is satisfied;
      start a timer to determine a wait period when the first condition is not satisfied;
      respond to the first memory load request with a reply, wherein the reply indicates that the first condition is not satisfied when the duration of the wait period exceeds a time-out threshold; and
      when the first condition is not satisfied:
         receive a first memory store request at a second time subsequent to the first time and prior to the wait period exceeding the time-out threshold, the first memory store request specifying the first memory address and a value;
         store the value at the first memory address;
         perform a second determination of whether the first condition is satisfied; and
         respond to the first memory load request with a reply, wherein the reply indicates that the first condition is satisfied when the second determination is that the first condition is satisfied.

10. The CLT device of claim 9, wherein the value specified by the first memory store request is used in the second determination of whether the first condition is satisfied.

11. The CLT device of claim 9, wherein the reply indicates that the first condition is satisfied when the first condition is satisfied.

12. The CLT device of claim 9, wherein the reply includes a value at the first memory address.

13. The CLT device of claim 9, wherein a value at the first memory address is used in the first determination of whether the first condition is satisfied.

14. The CLT device of claim 9, wherein the first memory load request includes an operand and the operand is used in the first determination of whether the first condition is satisfied.

15. A computer program product for responding to memory requests, the computer program product comprising a computer readable storage medium having program instructions embodied therewith, wherein the computer readable storage medium is not a transitory signal per se, the program instructions executable by a conditional load with time out (CLT) device to cause the CLT device to perform a method comprising:
- receiving a first memory load request by the CLT device at a first time, the first memory load request specifying a first condition and a first memory address;
- performing a first determination of whether the first condition is satisfied;
- starting a timer at the CLT device to determine a wait period when the first condition is not satisfied;
- responding to the first memory load request with a reply, wherein the reply indicates that the first condition is not satisfied when the duration of the wait period exceeds a time-out threshold; and
- when the first condition is not satisfied:
  - receiving a first memory store request by the CLT device at a second time subsequent to the first time and prior to the wait period exceeding the time-out threshold, the first memory store request specifying the first memory address and a value;
  - storing the value at the first memory address;
  - performing a second determination of whether the first condition is satisfied; and
  - responding to the first memory load request with a reply, wherein the reply indicates that the first condition is satisfied when the second determination is that the first condition is satisfied.

16. The computer program product of claim 15, wherein the reply indicates that the first condition is satisfied when the first condition is satisfied.

17. The computer program product of claim 15, wherein a value at the first memory address is used in the first determination of whether the first condition is satisfied.

* * * * *